Sept. 18, 1951     B. A. HAGGMARK     2,568,066
HOUSEHOLD APPLIANCE
Filed Dec. 10, 1947                         2 Sheets-Sheet 1
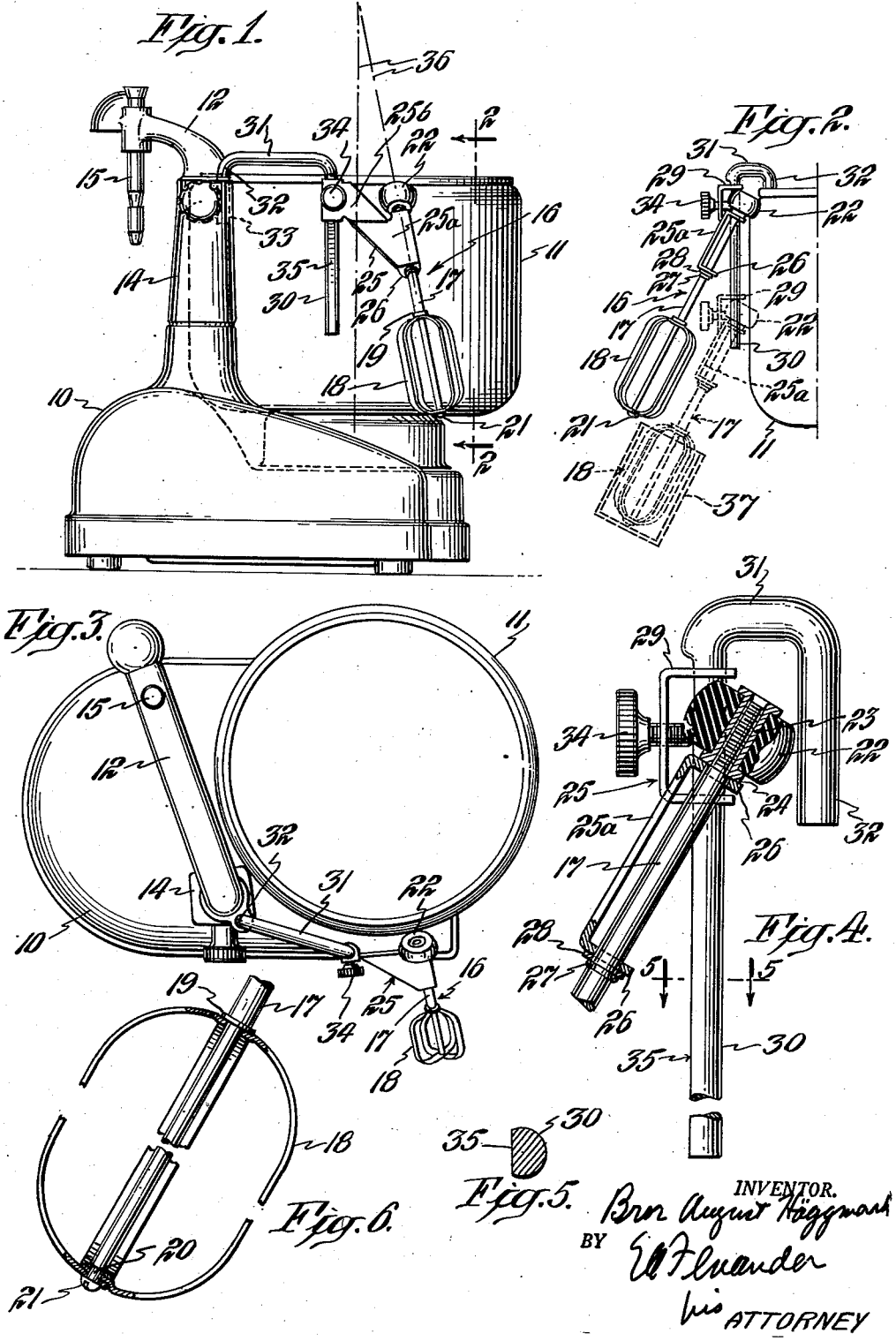
INVENTOR.
Bror August Häggmark
BY
his ATTORNEY Sept. 18, 1951  B. A. HAGGMARK  2,568,066
HOUSEHOLD APPLIANCE
Filed Dec. 10, 1947  2 Sheets-Sheet 2
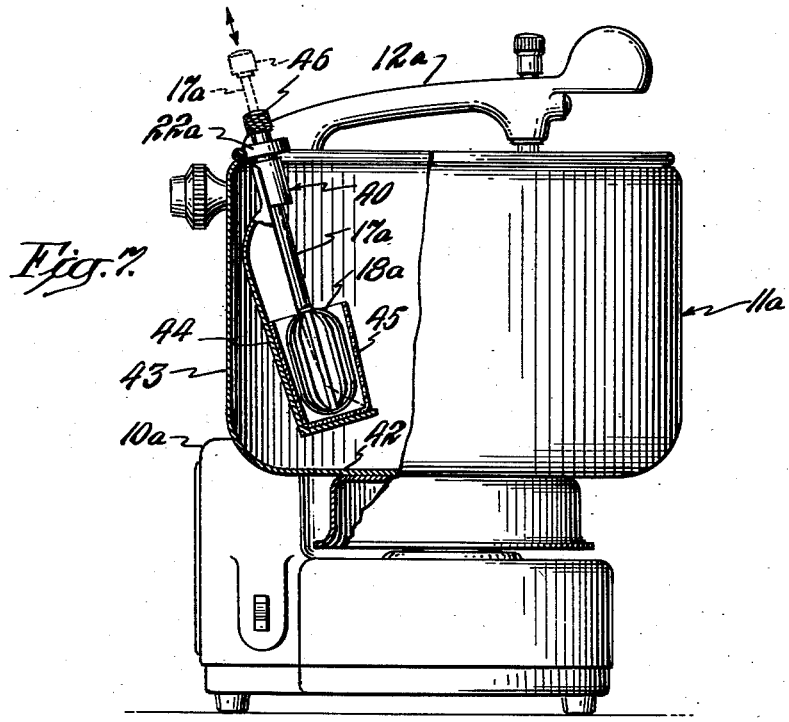
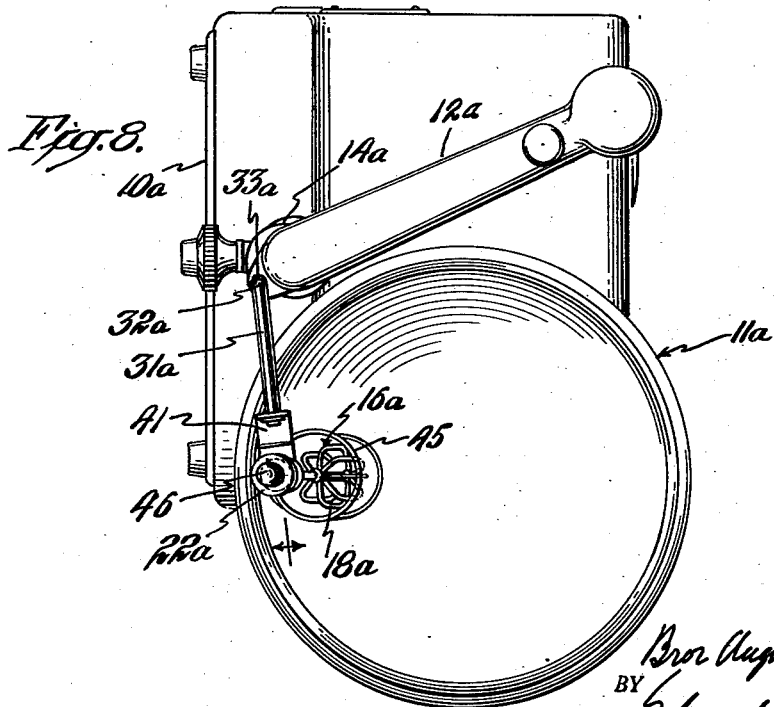

Patented Sept. 18, 1951

2,568,066

UNITED STATES PATENT OFFICE 2,568,066

HOUSEHOLD APPLIANCE

Bror August Häggmark, Solna, Sweden, assignor to Aktiebolaget Elektrolux, Stockholm, Sweden, a corporation of Sweden Application December 10, 1947, Serial No. 790,816
In Sweden December 12, 1946

21 Claims. (Cl. 259—85)

My invention relates to household appliances, and more particularly to such an appliance or tool which is employed as an accessory or attachment and operated with the aid of a rotatable member of a kitchen appliance or the like which may be motor driven.

It is an object of my invention to provide improvements for operating such an attachment or accessory with the aid of a rotatable member of a kitchen appliance or machine, such as a vessel or bowl, for example, particularly to provide a new arrangement in which the accessory is adapted to be driven by frictional contact with the side wall of the rotable member. Moreover, it is an object to provide such an improvement in household appliances which is economical to manufacture and extremely simple to use as an attachment or accessory of a kitchen machine or the like.

A further object is to provide such an improvement for operating a rotary beater or similar tool either outside or inside of the vessel or bowl of a kitchen machine, whereby loss of material splashed by heating and whipping and tending to adhere to the inside wall of a receptacle is minimized.

The above and other objects and advantages of the invention will be better understood from the following description taken in conjunction with the accompanying drawing forming a part of this specification, and of which:

Fig. 1 is a view in elevation of a kitchen appliance and accessory or attachment embodying the invention;

Fig. 2 is a fragmentary view in elevation, taken at line 2—2 of Fig. 1, to illustrate more clearly the cooperation of the kitchen appliance and accessory;

Fig. 3 is a top plan view of the kitchen appliance and accessory shown in Fig. 1;

Fig. 4 is a fragmentary view, partly broken away and in section, of the upper part of the accessory shown in Figs 1 to 3 and detachable mounting therefor;

Fig. 5 is a sectional view taken at line 5—5 of Fig. 4;

Fig. 6 is a fragmentary view, partly broken away and in section, of the bottom part of the accessory shown in Figs. 1 to 3;

Fig. 7 is a view in elevation of a kitchen appliance and accessory or attachment, partly broken away and in section, illustrating another embodiment of the invention; and Fig. 8 is a top plan view of the kitchen appliance and accessory shown in Fig. 7.

Referring to the drawing, I have shown my invention in connection with a kitchen appliance comprising a base member 10 having an upright vessel 11 mounted thereon for rotation about a vertical axis. This may be accomplished, for example, by providing a vertical shaft which projects upwardly from the base 10 and to which the bottom of the vessel is adapted to be detachably coupled, such shaft being arranged to be driven in any suitable manner by an electric motor mounted in the base. In order to simplify the drawing, the electric motor, vertical shaft and manner in which the vessel is coupled to the vessel have not been illustrated, it being understood that such motor driven connections are well known. By way of example and without limitation, the provisions for driving the vessel 11 may be of a type like that shown and described in United States Letters Patent No. 2,270,164, granted January 13, 1942, on the application of G. Du Rietz and L. J. F. Ell, to the assignee of the present invention, the disclosure of which may be considered as being incorporated in this application and to which reference may be made, if desired, for a detailed description of the kitchen appliance.

A kitchen appliance of the type illustrated is particularly suitable for preparing food, such as mixing, kneading and other similar operations, for example. In such use of the appliance, an arm 12 angularly movable about a column 14 on the base 10 is moved to such a position that a pin 15 vertically movable at the end of the arm is disposed within the vessel 11. A suitable roller (not shown) is adapted to be rotatably mounted on the pin to promote mixing and other similar operations when the vessel 11 is rotated. The kitchen appliance may be advantageously employed to operate an accessory or attachment, such as a whisk or rotary beater 16, for example. When using the kitchen appliance to operate such an accessory, the arm 12 desirably is moved to an inactive position removed from the vessel 11, as shown in Figs. 1 and 3.

The rotary beater 16 includes a shaft 17 to one end of which are secured metal strips forming a beater head 18. As shown, this is accomplished by providing a shoulder 19 intermediate the ends of shaft 17 at the underside of which the beater head 18 is adapted to bear, and a reduced end portion 20 which accommodates the lower apertured end of the beater head. The reduced end portion 20 of the shaft 17 and aperture in the beater head 18 are square shaped, for example, to prevent relative angular movement therebetween, and the reduced end portion is formed to receive a tightening screw 21 to clamp the beater head in position in such manner that the metal strips will be maintained under tension.

In accordance with my invention, the rotary beater 16 is positioned outside the vessel 11 and arranged to be driven by the latter. In the embodiment illustrated, this is accomplished by providing a roller 22 at the opposite end of shaft 17 from the beater head 18 which is adapted to bear against and frictionally engage the outer wall surface of the vessel 11 to impart rotating movement thereto when the vessel 11 is rotated.

The roller 22, which may be formed of rubber and shaped to provide a curved or rounded outer surface, is apertured and disposed about a hollow sleeve or bushing 23. The bushing 23 is threadedly connected to the upper reduced end of the shaft 17 and formed with outwardly extending flanges 24 at its ends which overlie the ends of the roller 22 and snugly hold the latter in position. By providing a roller 22 which is threadedly secured to the shaft 17 with the aid of the bushing 23 and hence rotatable on the shaft, the life of the roller is prolonged. However, the threads on the upper end of the shaft 17 and bushing 23 are formed in such manner that the roller 22 will be rigidly fixed to the shaft and relative movement therebetween will not occur when the roller is in frictional engagement with the vessel and rotating movement is imparted thereto by the vessel.

Suitable supporting structure is provided for the rotary beater 16 to move the latter toward and from the vessel 11 and bring the roller 22 in frictional engagement with the vessel. Such supporting structure comprises a holder 25 including a portion 25a formed with apertured flanges or tabs 26 through which the shaft 17 extends. The shaft 17 is held in position on the holder 25 by the bushing 23 which bears against the upper flange 26, and by a split ring or collar 27 which acts against the lower flange and is resiliently retained in an annular groove formed on the shaft, a washer 28 being interposed between the ring 27 and lower flange 26 to reduce friction and minimize rubbing of parts against one another.

The holder 25 also includes a portion 25b which is formed with apertured tabs or flanges 29 through which extends one leg 30 of an inverted U-shaped member or arm 31, the other leg 32 of which is adapted to be positioned in a recess 33 formed at the upper end of column 14. The holder 25 is vertically adjustable on the leg 30 and the portion 25b thereof is formed to receive a screw 34 which can be moved axially to cause the end thereof to bear against a flattened portion 35 of the leg 30, as best shown in Figs. 4 and 5. The apertures in the tabs 29 and cross-section of the leg 30 are of similar shape to prevent relative angular movement of the holder 25 on the leg 30 while permitting vertical adjustment of the holder.

In view of the foregoing, it will now be understood that the rotary beater 16 is employed as an accessory or attachment which is operated with the aid of the kitchen appliance described and illustrated. When it is desired to use the rotary beater 16, the portion 25b of the holder 25 is clamped to the leg 30 of the arm 31 and the latter is angularly moved about its axis of rotation at the recess 33, so that the roller 22 will frictionally engage the outer peripheral surface of the vessel at a region between its upper and lower extremeties. An operator may conveniently hold the roller 22 in frictional engagement with the vessel 11 by grasping the horizontal part of the arm 31 or by applying force to the holder 25, whereby rotating movement will be imparted to the roller 22 when the vessel 11 is being driven. When it is desired to terminate the operation of the rotary beater 16, the arm 31 is simply moved angularly in a direction from the vessel 11 to disengage the roller 22 therefrom.

It will be seen that the legs 30 and 32 of the arm 31 are more or less parallel to the axis of rotation of the vessel 11, and that the arm is angularly movable about a vertical axis at the recess 33 which is also substantially parallel to the vertical axis about which the vessel rotates. The holder 25 may be conveniently stamped from sheet metal, for example, the portion 25b thereof being substantially upright when clamped to the leg 30. However, the portion 25a of the holder is in an inclined position whereby the longitudinal axis of the beater 16 forms an acute angle with the vertical axis of rotation of the vessel 11, as indicated by the dotted lines 36 in Fig. 1. With such arrangement, the beater head or working end 18 points downwardly and projects radially outward from the region at which the roller 22 frictionally contacts the vessel 11. In this way the working end of the accessory or attachment is removed from the immediate vicinity of the vessel and is not in close proximity thereto, thereby facilitating its use. This is especially true of a rotary beater when the latter is employed to whip cream or beat eggs in a vessel like a small bowl or cup, for example, which is held or positioned so that the beater head will be disposed within the vessel and effective to accomplish its whipping or beating action.

Many advantages are gained by providing an arrangement like that illustrated and described to operate the rotary beater unit which is disposed in its entirety outside and without the outer periphery of the vessel. While the vessel 11 may be employed to beat eggs and other material by a rotary beater adapted to be positioned therein, such vessel usually is quite large for the reason that it is used for a variety of purposes including the preparation of a relatively large quantity of material at a single time. When such a large vessel or bowl is employed to beat a small amount of material, such as one or two egg whites, for example, a large part of the material splashes about in all directions and sticks and adheres to the relatively extensive wall surface at the inside of the bowl which is wasteful and uneconomical because it constitutes a relatively large portion of the entire quantity of material initially placed in the bowl.

In accord with the invention, the rotary beater 16 is adapted to be operated at the outside of the bowl or vessel 11, and a receptacle of appropriate size may be selected for beating or whipping material which is dependent upon the amount of material at hand. Such receptacle containing the material is simply moved to position the beater head 18 therein, or the receptacle containing the material may be placed on the same supporting surface as the kitchen appliance and the rotary beater moved downwardly, as from the solid line position to the dotted line position shown in Fig. 2, to position the beater head 18 in the receptacle 37. In this manner excessive loss of material due to splashing will be avoided, and the amount of material adhering to the inner wall surface will always be at a minimum and insignificant by choosing the smallest size receptacle in which the quantity of material at hand can be conveniently acted upon by the beater head.

A further advantage is gained by the arrangement provided in that certain operations can be performed on material in the vessel 11 without disturbing the latter. The rotary beater 16 can be conveniently employed to whip or beat ingredients to be added and mixed with the material held in the vessel.

Figs. 7 and 8 illustrate another embodiment of the invention in which the accessory or attachment is supported within the vessel or bowl. In Figs. 7 and 8 the open top vessel 11a is mounted on the base 10a for rotation about a vertical axis. The arm 12a, which is similar to the arm 12 in Figs. 1 and 3, is angularly movable about a column 14a projecting from the base 10a. One leg 32a of an L-shaped arm or member 31a is adapted to be positioned in a recess 33a formed at the upper end of column 14a, the member 31a being angularly movable about the vertical axis of the leg 32a.

To the outer end of member 31a is fixed a plate 41 to which is secured a holder 40. As best shown in Fig. 7, the holder 40 is in the form of a hollow sleeve in which the upper end of a shaft 17a of a rotary beater unit 16a is journaled. As in the embodiment described above, a roller 22a is rigidly fixed to the shaft 17a at a region thereof above the holder 40, thereby limiting downward movement of the shaft 17a at the lower end of which is provided a beater head 18a similar to the beater head 18 in Figs. 1 to 3 and previously described.

A knob 46 is fixedly secured to the upper end of the shaft 17a whereby the latter may be raised from the position shown in solid lines to a raised position shown in dotted lines in Fig. 7. When this is done, the beater head 18a is raised a corresponding distance within the vessel 11a.

To facilitate use of the rotary beater unit 16a within the vessel or bowl 11a, provision is made to provide a support for a small receptacle 45 within which the head or working end 18a is adapted to be positioned. Such a support may comprise a basket 44 carried by the holder 40. As best seen in Fig. 7, the basket 44 includes a bottom and curved side wall which is open at the side facing the center region of the bowl 11a to enable the small receptacle to be placed snugly in position while the beater head 18a is in its raised position.

When it is desired to use the rotary beater 16a, the leg 32a of the member 31a is positioned in the recess 33a at the upper end of the column 14a with the beater unit 16a disposed within the vessel 11a. While the vessel 11a is being driven, the member 31a is angularly moved about its axis of rotation to bring the roller 22a in frictional engagement with the inner surface of the side wall of the vessel adjacent the open end thereof. In this way rotating movement is imparted to the roller 22a and shaft 17a to drive the beater head 18a. By positioning the head 18a and small receptacle 45 within the larger bowl 11a, any splashing of material acted upon by the beater head within the small receptacle is confined within the larger bowl. In this way the larger bowl serves as a protective shield to confine any material which may splash out of the small receptacle when the rotary beater unit is being used. When it is desired to terminate the operation of the rotary beater 16a, the arm 31a is simply moved angularly in a direction toward the center of the vessel or bowl 11a, thereby disengaging the roller 22a from the side wall of the bowl.

In the embodiment of Figs. 7 and 8, as in the embodiment first described, the longitudinal axis of the beater 16a forms an acute angle with the vertical. Hence, in Figs. 7 and 8 the beater head or working end 18a points downwardly and is directed radially inward from the region at which the roller 22a frictionally contacts the side wall of the vessel 11a. In this way the working end of the accessory or attachment is removed from the vicinity of the vessel immediately adjacent the side wall thereof. This provides space at the side wall of the vessel 11a for the basket support 44 which is carried by the holder 40 and depends downwardly therefrom, and also makes possible the proper positioning of the small receptacle 45 in the vessel 11a to accommodate the beater head 18a therein. In Figs. 7 and 8 the beater head 18a is not only removed from the side wall of the vessel 11a but also from the bottom thereof. The shaft 17a may be inclined radially inwardly from the side wall of the vessel at an acute angle to the vertical of as much as 45°, for example.

Modifications of the invention which I have described will occur to those skilled in the art, so that I desire my invention not to be limited to the particular arrangements set forth. Thus, the beater head 18 may be removably secured to the shaft 17 in such manner that it can be readily detached therefrom and replaced by other tools or household appliances like a buffer, cleaning cloth wheel or rotary brush, for example. Therefore, I intend in the claims to cover all those modifications which do not depart from the spirit and scope of my invention.

What is claimed is:

1. In combination with a kitchen utility device having a base and an upright vessel mounted for rotation on said base about a vertical axis, of a rotary type beater unit adapted to beat in a separate receptacle a relatively small quantity of matter, such beater unit comprising rotatable shaft means, a beater head at the lower end of said shaft means, and a roller at the opposite extreme upper end of said shaft means which is axially removed from said beater head and capable of operating the latter when rotating movement is imparted thereto, an apertured member which receives and journals said shaft means at a region thereof which is between said roller and said beater head and disposed entirely above the latter, and structure including said apertured member for supporting said beater unit in an operative position in which said roller is in frictional engagement with the wall of the vessel to impart rotating movement thereto when the vessel is rotated, said supporting structure being so constructed and arranged that said beater unit in its entirety is disposed without the outer peripheral surface of the vessel when said roller is in frictional engagement therewith.

2. In combination with a food mixing machine or like device having a base and an open top vessel adapted to be mounted for rotation on said base about a vertical axis, such machine having provisions for driving the vessel, of a rotary type beater unit adapted to beat in a separate receptacle a relatively small quantity of matter, such beater unit comprising rotatable shaft means, a beater head at the lower end of said shaft means, and a rotatable element at the opposite extreme upper end of said shaft means which is axially removed from said beater head and capable of operating said beater head when rotating movement is imparted thereto, an apertured member which receives and journals said shaft means at a region thereof which is between said rotatable element and said beater head and disposed entirely above the latter, and structure mounted on the base and including a movable part for supporting said apertured member, said part being operable to move said unit toward and from the vessel and bring said rotatable element in frictional engagement with the side wall of the vessel to impart rotating movement thereto when the vessel is being driven, said supporting structure and said apertured member being so constructed and arranged that said beater head points downwardly and the longitudinal axis thereof is inclined to the axis of rotation of the vessel to position such beater head away from the immediate vicinity of and in close proximity to the side wall of the vessel to facilitate use of the beater head in the separate receptacle when said rotatable element is in frictional engagement with the vessel.

3. The combination set forth in claim 2 in which said apertured member is vertically adjustable on said movable part.

4. The combination set forth in claim 2 in which said beater unit is positioned within said vessel so that said movable part is operable to move said rotatable element in frictional engagement with the wall of the vessel and said beater head is spaced from the side wall and also the bottom of the vessel.

5. The combination set forth in claim 4 in which the longitudinal axis of said beater head is inclined downwardly and inwardly with respect to the side wall of the vessel at an angle of about 45° thereto.

6. The combination set forth in claim 2 which includes a holder carried by said supporting structure for removably supporting thereon the separate receptacle which is smaller than the vessel and in which said beater head is adapted to be positioned.

7. The combination set forth in claim 2 which includes a holder carried by said apertured member adapted to support thereon the separate receptacle in which said beater head is adapted to be positioned.

8. The combination set forth in claim 7 in which said beater head is vertically movable with respect to said apertured member.

9. The combination set forth in claim 2 in which said beater unit is supported within the vessel and said movable part is operable to move said rotatable element in frictional engagement with the side wall of the vessel, said beater head being spaced from the side wall and bottom of the vessel when said rotatable element is in frictional engagement with the side wall of the vessel, said apertured member including supporting means upon which can be placed the separate receptacle and within which said beater head is adapted to be positioned.

10. In combination with a food mixing machine or like device having a base, a part projecting from the base and an open top vessel mounted for rotation on the base about a vertical axis, such machine having provisions for driving the vessel, of a rotary type beater unit comprising a holder, shaft means rotatably mounted on said holder, a beater head at one end of said shaft means, a roller at the opposite end of said shaft means capable of operating said unit when rotating movement is imparted thereto, a member having substantially parallel arms in spaced relation, one of the arms being rotatably supported on the projecting part, means for detachably securing said holder to said other arm, said member being angularly movable to bring said roller in frictional engagement with a side wall region of the vessel to impart rotating movement thereto when the vessel is being driven, said holder and shaft means thereon being so constructed and arranged that, when said holder is detachably secured to said other arm and said roller is in frictional engagement with the vessel, the beater head points downwardly and said shaft means is inclined to the vertical to position the beater head away from the side wall of the vessel to facilitate use thereof.

11. For use with a kitchen utility device having a base and an upright member adapted to be mounted for rotation thereon about a vertical axis, such device including provisions for rotating the member, an accessory comprising a rotatable element, a roller operatively associated with said element and turnable therewith, supporting structure for said accessory which enables the latter to be moved toward and from the member and bring said roller in frictional engagement with the outer peripheral wall surface of the member to impart rotating movement to said element when said member is rotated, said supporting structure including a part angularly movable toward and from the member, such part having an arm substantially parallel to the axis of rotation of the member, a holder for said accessory which is carried by said arm and vertically adjustable thereon, said holder being formed to hold said accessory in an inclined position with respect to said arm, and said supporting structure being so constructed and arranged that said roller and accessory in their entirety project outwardly from the outer peripheral wall surface of the member when said roller is in frictional engagement therewith.

12. Apparatus as set forth in claim 11 in which said arm is non-circular in cross section and formed with an axially extending flattened portion, and said holder comprises a U-shaped strap having non-circular openings in the end ears thereof through which said arm is adapted to extend, the shape of the openings being generally similar to the cross-section of said arm, and means to lock said strap in position including a part which is threadedly connected to said strap and movable to act upon the flattened portion of said arm.

13. In combination with a food mixing machine or like device having a base, a part projecting from the base and an open top vessel mounted for rotation on the base about a vertical axis, such machine having provisions for driving the vessel, of a rotary type beater unit comprising a holder, shaft means rotatably mounted on said holder, a beater head at one end of said shaft means, a roller at the opposite end of said shaft means, means capable of operating said unit when rotating movement is imparted thereto, a member having at least two arms, one of the arms being rotatably supported on the projecting part, means for securing said holder to another arm at a region removed from the axis of rotation of said one arm, said member being angularly movable to bring said roller in frictional engagement with a side wall region of the vessel to impart rotating movement thereto when the vessel is being driven, said holder and shaft means being so constructed and arranged that, when said holder is secured to said other arm and said roller is in frictional engagement with the vessel, the beater head points downwardly and said shaft means is inclined to the vertical to position the beater head away from the side wall of the vessel to facilitate use thereof.

14. For use with a kitchen utility device including a base and an open top vessel adapted to be mounted for rotation on said base about a vertical axis and a separate receptacle adapted to hold a relatively small quantity of matter, such vessel having an upstanding side wall, an accessory comprising a rotatable whisk for whipping matter in the separate receptacle, a roller, means including a shaft for operatively associating said whisk and said roller, an apertured member which receives and journals said shaft at one region thereof which is interposed between said roller and said whisk, and supporting structure for said apertured member which enables said accessory to be moved toward and from the vessel and bring said roller in frictional engagement with the side wall thereof to impart rotating movement to said whisk when the vessel is being rotated, said accessory being so disposed that the whisk points downwardly and is spaced from the side wall of the vessel a sufficient distance to enable the whisk to be positioned in the receptacle when the roller is in frictional engagement with the side wall of the vessel.

15. Apparatus as set forth in claim 14 in which said roller and whisk in their entirety project outwardly from the outer peripheral surface of the side wall of the vessel when said roller is in frictional engagement therewith.

16. Apparatus as set forth in claim 14 in which said whisk projects inwardly from the inner peripheral surface of the side wall of the vessel and is spaced from the bottom thereof when said roller is in frictional engagement with the side wall.

17. In combination with a food mixing machine or like device having a base and an open top vessel having an upstanding side wall which is adapted to be mounted for rotation on the base about a vertical axis, such machine having provisions for driving the vessel, of a rotary type beater unit comprising a holder, rotatable shaft means on said holder, a beater head at the lower end of said shaft means, a roller at the opposite upper end of said shaft means which is axially removed from said beater head and capable of operating said unit when rotating movement is imparted thereto, and structure carried by said base having a part angularly movable about a second vertical axis which is located exteriorly of the vessel, and means for securing said holder to said part, said part being angularly movable to bring said roller in frictional engagement with a side wall region of the vessel to impart rotating movement thereto when the vessel is being driven, said shaft means being inclined to the vertical to position the beater head away from the side wall of the vessel to facilitate use of the beater head in a separate receptacle when said roller is in frictional engagement with the vessel.

18. The combination set forth in claim 17 in which said supporting structure is so constructed and arranged that said part is angularly movable about the second vertical axis to bring said roller in frictional engagement with the outer peripheral wall surface of the vessel, said beater head projecting downwardly and outwardly from the outer peripheral wall surface of the vessel when said roller is in frictional engagement therewith.

19. The combination set forth in claim 17 in which said supporting structure is so constructed and arranged that said part is angularly movable about the second vertical axis to bring said roller in frictional engagement with the inner peripheral wall surface of the vessel, said beater head projecting downwardly and inwardly from the inner peripheral wall surface of the vessel when said roller is in frictional engagement therewith.

20. The combination set forth in claim 17 in which said part angularly movable about the second vertical axis has vertical extent, and said means for securing said holder to said part includes provisions for detachably fixing said holder at any one of a number of different elevations.

21. In combination with a food mixing machine or like device having a base and an open top vessel adapted to be mounted for rotation on the base about a vertical axis, such machine having provisions for driving the vessel, of a rotary type beater unit adapted to beat in a separate receptacle a relatively small quantity of matter, such beater unit comprising a rotatable shaft, a beater head at the lower end of said shaft, a roller at the opposite upper end of said shaft which is axially removed from said beater head and capable of operating said unit when rotating movement is imparted thereto, an apertured member which receives and journals said shaft at an intermediate region thereof which is interposed between said roller and said beater head and disposed entirely above the latter, said roller being rigidly fixed to the extreme upper end of said shaft and cooperating with said apertured member to limit downward movement of said shaft, supporting structure carried by said base having a part angularly movable about a vertical axis which is located exteriorly of the vessel, and means for securing said apertured member to said part, said part being angularly movable to bring said roller in frictional engagement with a side wall region of the vessel to impart rotating movement thereto when the vessel is being driven, said supporting structure and said apertured member being so constructed and arranged that said beater head points downwardly and the longitudinal axis thereof is inclined to the axis of rotation of the vessel to position the beater head away from the immediate vicinity of and in close proximity to the side wall of the vessel to facilitate use of the beater head in the separate receptacle when said roller is in frictional engagement with the vessel.

BROR AUGUST HÄGGMARK.

REFERENCES CITED

The following references are of record in the file of this patent:

UNITED STATES PATENTS

| Number | Name | Date |
| --- | --- | --- |
| 527,033 | Webber | Oct. 2, 1894 |
| 1,588,333 | Purner | June 8, 1926 |
| 1,752,833 | Brumder | Apr. 1, 1930 |
| 1,898,986 | Fitzgerald | Feb. 21, 1933 |
| 1,963,534 | Toruff | June 19, 1934 |
| 2,270,164 | Du Rietz et al. | Jan. 13, 1942 |